United States Patent Office 3,761,300
Patented Sept. 25, 1973

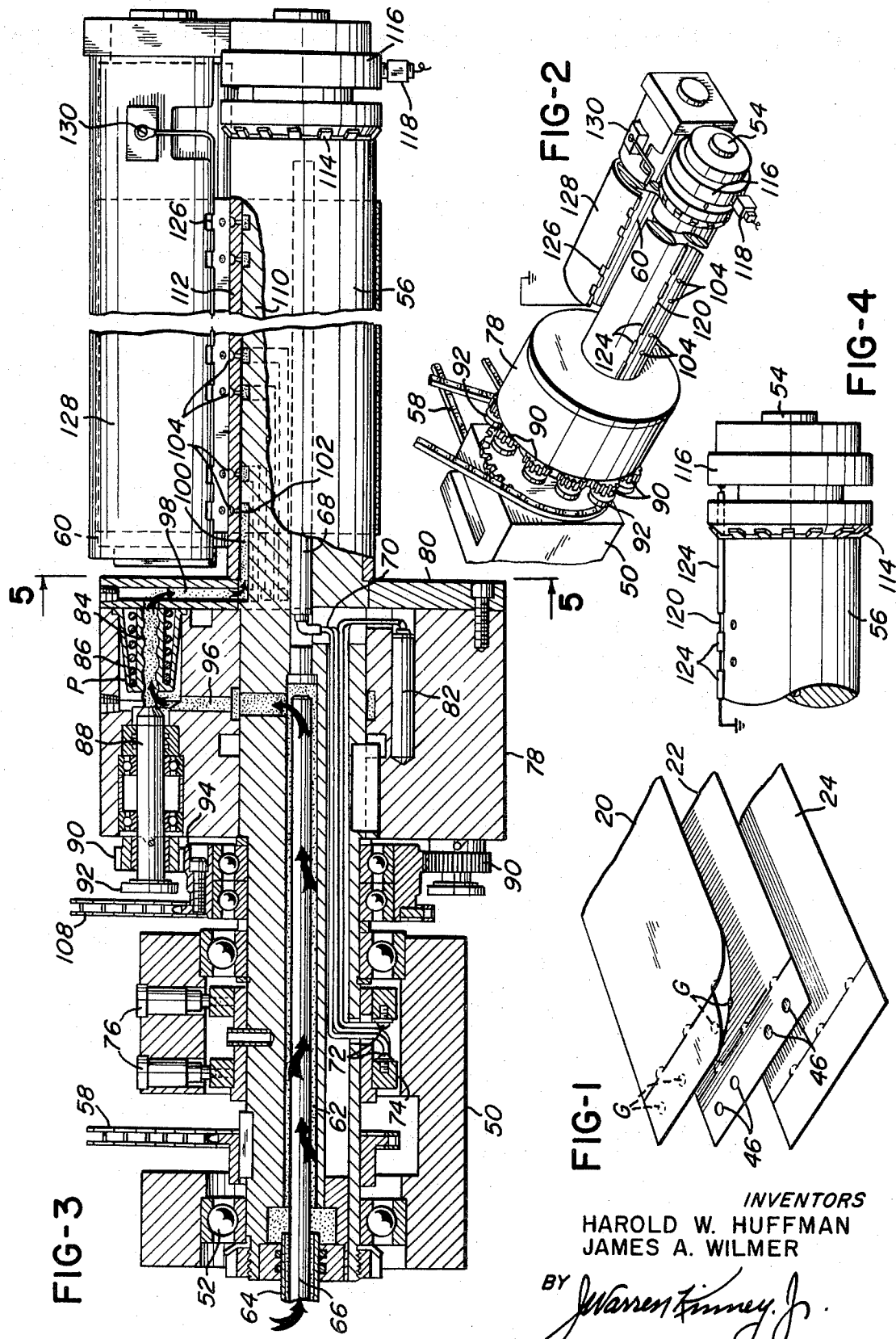

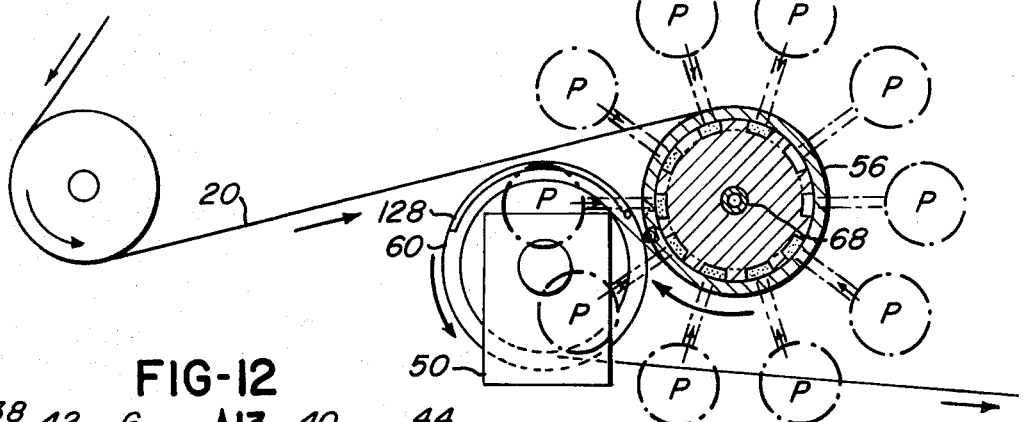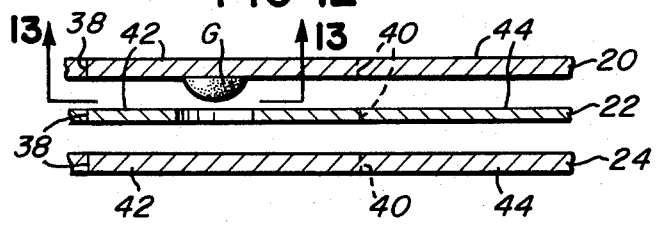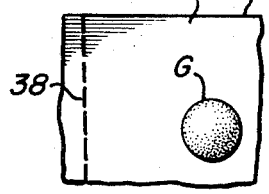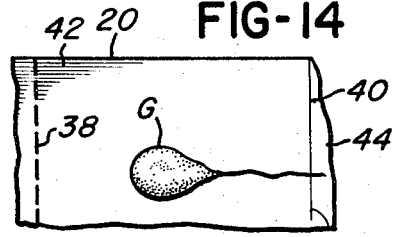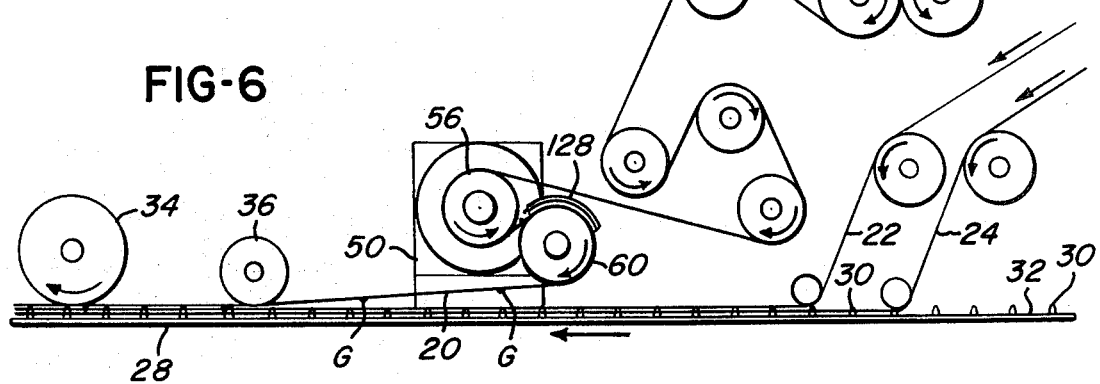

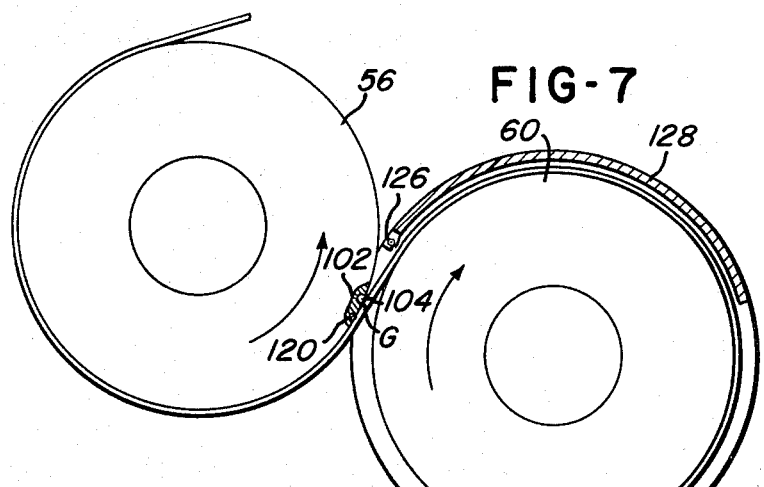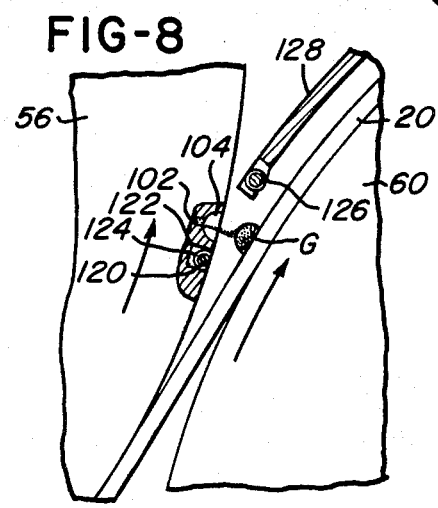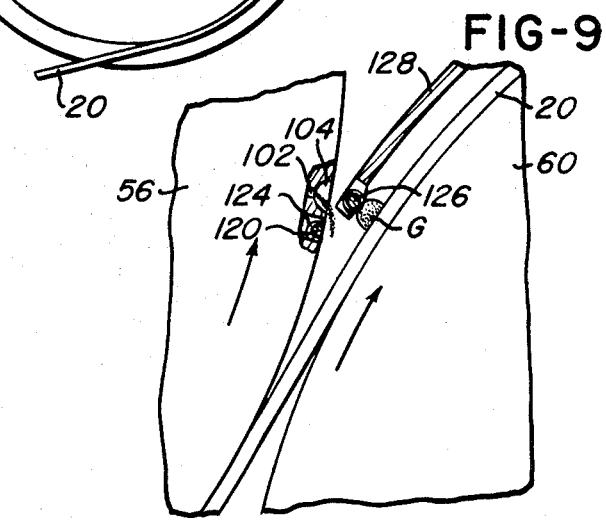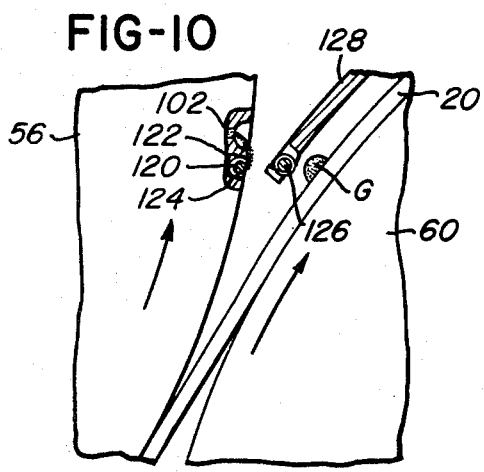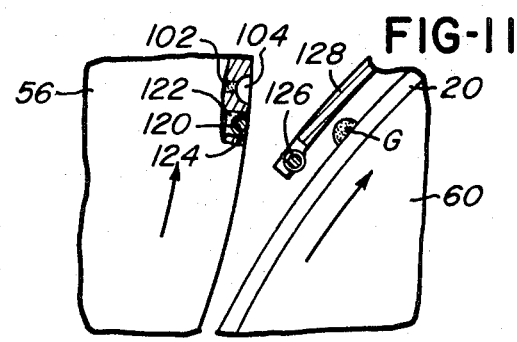

3,761,300
METHOD OF DISINTEGRATING A GLUE STRING ATTACHED TO A GLUE BEAD BY MEANS OF A HEATED WIRE OR THE LIKE AND AFTER SAID BEAD IS APPLIED TO A WEB
Harold W. Huffman, Fairfield, Ohio, and James A. Wilmer, Fort Thomas, Ky., assignors to The Hamilton Tool Company, Hamilton, Ohio
Filed Sept. 22, 1971, Ser. No. 182,720
Int. Cl. B05c 3/20
U.S. Cl. 117—38                                  10 Claims

ABSTRACT OF THE DISCLOSURE

The method of disintegrating a glue string attached to a bead after application of the bead to a web.

BACKGROUND OF THE INVENTION

In the manufacture of multi-sheet paper business forms and the like, webs of paper commonly are supplied in large rolls so arranged that a plurality of rolls in rotating will pay out the webs simultaneously, with the webs superposed upon one another in exact registry, to form a multi-sheet assembly. Exact registry of the webs upon one another usually is obtained by providing each web with a line of equally spaced register perforations, along one or both side margins thereof, to engage correspondingly spaced guide pins of a pin-band collator conveyor.

The number of sheets or layers constituting a multi-sheet assembly may vary, and some may be characteristically different from others. That is, some of the sheets may be of heavy stock, whereas others may be of lighter gauge, and still others may be data transfer or carbonized sheets interposed for making copies by impression. All sheets of an assembly, however, will be aligned and registered at the side perforations with great precision.

It has been common practice heretofore, to secure the several layers of a web to one another by means of a cement or glue applied along one of the side margins of each web, so that the webs may not shift relatively and become misaligned prior to commercial use thereof. The glue or cement usually is applied concurrently with the collating operation.

SUMMARY OF THE INVENTION

It is sometimes desirable to glue or cement the webs of a multi-layer assembly to one another along lines of attachment which are transverse to the direction of web feed in the collator. By preference, such transverse lines of attachment comprise individual spots of glue spaced apart in a line intermediate the web side margins, the arrangement being such that each single spot or bead of glue applied to one web only, will serve to join together flatwise all of the webs of a multi-layer assembly.

To accomplish the aforesaid transverse web securement, those webs which are interposed between the uppermost and the lowermost webs, or the outermost webs of a group, are perforated at intervals transversely of the webs, the corresponding perforations of said interposed webs being in the form of apertures or openings of equal size. The apertures preferably are circular in form, and should be no smaller than a drop, spot, or bead of hot melt glue which will be applied to one of the unperforated outermost webs. The drop or bead of glue deposited on an unperforated web (FIG. 12) will, according to the present invention, project itself through the coinciding apertures of the intermediate webs, and adhere to the remaining unperforated web thereby to form an integrated structure in which all of the webs are accurately coinciding.

The transverse line of glue-receptive apertures generally is located within the limits of a narrow detachable tab which is initially integral with the web assembly, and defined by a pair of spaced parallel lines of severance directed transversely of the webs. If any of the glue for integrating the detachable tab is accidentally thrown or spilled onto adjacent areas of a multi-layer web in motion, the webs will become glued together where they should be free of connection, with the result of debarring their use as multi-ply business forms.

The improved apparatus of the present invention provides high-speed rotary means for applying hot melt glue spots or beads to one web of a group of webs, with properly located apertures of intermediate webs arranged for accurately dispersing the glue and integrating the webs at preselected locations. The spots or beads of glue are formed repeatedly on the periphery of a rapidly rotating applicator roll, and as rapidly as the beads are formed, they are transferred to a web which is trained about the applicator roll.

In transferring from the applicator roll to the web, the bead of glue due to its viscosity may stretch out to form a thin string or tail spanning the space between the roll and the web (FIG. 8); and this string or tail if uncontrolled, will break and spread itself indiscriminately over remote portions of the web where its presence renders the product unfit for use.

To control the aforesaid undesirable dispersal of viscous glue strings over the web surfaces, means is provided adjacent to the glue spot transfer zone, to burn and substantially vaporize the glue strings or tails before they can be flung onto remote areas of the web by the rapid movement of the web and the applicator roll. Burning and disintegrating of the glue strings is accomplished by means of electrically heated incandescent resistance wires strategically located to intercept the strings as formed during the glue spot or bead transfer phase of the procedure. The resistance wires are maintained at cherry red heat, with a temperature approximating 1200° F. By burning and vaporizing the unwanted glue strings (sometimes referred to as angel hair), a rapid uninterrupted production of perfect multi-layer forms is assured.

BRIEF DESCRIPTION OF THE DRAWINGS

FIG. 1 is a fragmentary perspective view of several superposed webs in condition for collating, and showing by way of example, a perforate web located between two imperforate webs preparatory to web integration by means of glue spots or beads applied to one of the imperforate webs.

FIG. 2 is a perspective view of a rotary glue applicator and its drive mechanism, embodying the improvements of the present invention.

FIG. 3 is an enlarged vertical cross-section taken through the glue applicator roll of the FIG. 2 mechanism.

FIG. 4 is a fragmentary side elevation of the applicator roll shown at the right end of FIG. 2.

FIG. 5 is a schematic view on line 5—5 of FIG. 3, illustrating a desired relationship between a series of individually controllable glue pumps and a series of individual glue cavities supplied by the pumps.

FIG. 6 is a diagrammatic view illustrating the present device applied to a typical collating mechanism.

FIG. 7 is an enlarged schematic end view of FIG. 2, parts broken away, and showing the glue applicator roll and stripper roll relationship to a web about to receive a glue bead or globule.

FIGS. 8 through 11 are fragmentary enlargements of FIG. 7, showing several progressive steps in the application of a glue bead to a web, and the destruction of a glue string accompanying the application.

FIG. 12 is a greatly enlarged cross-section of FIG. 1.

FIG. 13 is a cross-section taken on line 13—13 of FIG.

12, and showing an exemplary satisfactory glue bead applied to a web.

FIG. 14 is a view similar to FIG. 13, showing an unsatisfactory glue bead having a string or tail such as will be eliminated by the hot wire means of the invention.

DESCRIPTION OF THE PREFERRED EMBODIMENT

With reference first to FIG. 6, the numerals 20, 22, 24, indicate rapidly moving webs of paper or the like, each emanating from a large roll such as 26 feeding the webs to a collating mechanism 28. Each web carries along one or both of its side margins a line of uniformly sized and equally spaced holes (not shown), whereby the webs may be impaled on the upright pins 30 of a moving pin band 32, which advances the webs and furnishes a means of placing the webs in precise coincidence preparatory to flatwise joinder by means of an ironing roll 34. Ahead of the ironing roll is a knock-down brush 36.

It should be noted that the upper and lower webs 20 and 24 of the group or assembly, embrace one or more intermediate webs 22, only one of such webs 22 being shown in the drawing, but with the understanding that the number of intermediate webs will often range between two and six. All of the webs preferably have transverse lines of severance 38, 40, which are parallel and spaced apart to form narrow tabs 42 that may be torn from the body portion 44. The webs usually will be transversely scored or perforated at rather close intervals throughout the length thereof, to provide a great number of connected business forms or the like each comprising a body 44 and a tab 42.

The tabs 42 of the outermost webs 20 and 24 are imperforate (FIGS. 1 and 12), whereas the tabs of all the intermediate webs are provided with perforations 46 which usually are arranged in a row or straight line extending transversely of the web. Perforations 46 preferably are circular in form, though they may be otherwise shaped if desired. Corresponding perforations 46 of all intermediate webs are adapted to register with one another when the webs are accurately superposed one upon another in collating, regardless of the number of webs included in a group or assembly.

In accordance with the present invention, means is provided for depositing upon the underface of an imperforate tab of one web such as 20 (FIG. 1), a line or row of glue spots, globules, or beads G, these being spaced apart in correspondency with the spacing of tab perforations 46. Obviously, as the webs then pass under the ironing roll 34, the beads of glue G will be forced through the tab perforations and into contact with the imperforate tab of outer web 24, thereby to bond all of the perforated tabs between the tabs of the outermost webs 20 and 24.

The glue employed in the above procedure preferably is hot melt glue, or an equivalent thereof, which is fast setting, relatively inexpensive, and subject to accurate control and regulation of the size, shape, and viscosity of beads or globules formed and applied to the moving web at high web speeds. Water based cold glues presently obtainable do not meet the above requirements, and are therefore not generally suited for use in the present system.

The applicator for depositing glue upon web 20 in the manner above explained, comprises a base 50 which may be fixedly mounted upon the frame of a collator 28. The base carries suitable bearings 52 for rotatably supporting the drive shaft 54 of a glue applicator roll 56 which is in axial alignment with said shaft. Shaft 54 may be rotated by means of a chain and sprocket drive 58, or equivalent drive means, whereby the roll 56 is rotated at a surface speed equal to that of web 20 which is trained thereon.

At 60 is indicated a stripper roll, the purpose of which is to receive web 20 from the glue applicator roll after glue beads G have been applied thereto. The stripper roll is driven at a surface speed equal to that of roll 56, but in the opposite direction of rotation. As indicated upon FIG. 6, the web 20 with glue beads G applied, leaves the stripper roll 60 and is laid down on top of web 22 under the guidance of band pins 30, for passage beneath ironing roll 34.

Applicator shaft 54 has an axial bore 62 which serves as a passageway for liquified hot glue introduced under low pressure by way of a feed pipe 64. The same bore accommodates a rod-shaped electric heater 66. A second electric heater 68 is supported in the forward portion of bore 62, and serves to constantly maintain the applicator roll 56 at an elevated temperature sufficient to maintain a fluid condition of glue carried by the roll, as will be explained. Electric current for energizing the heater 68 may be supplied by means of conductors 70 having connections at 72, 72 upon contact rings 74, 74, which rings in rotating with shaft 54 have brush contact with fixed terminals 76, 76 carried by base 50.

Upon shaft 54 is fixed and keyed a pump carrier member 78, which may be in the form of a cylindrical drum. One end of the drum carries a fixed end plate 80. At several locations within the drum are embedded electric heaters 82 which receive current from the contact rings 74, 74, to maintain the drum at an elevated temperature favorable to liquification of hot melt glue fed through shaft bore 62.

Pump carrier 78 has incorporated therein a number of individual screw-type glue pumps P each comprising a rotor 84 and a stator 86, the rotor being driven by a shaft 88, which carries a pinion 90 and a de-clutching knob 92. A planetary gear 94 is in constant driving relationship with pinion 90, but may be de-clutched therefrom by manipulation of knob 92 to terminate the drive. The carrier may be presumed, by way of example, to incorporate twelve individual glue pumps such as P, each of which is driveable from main gear 94 through a declutchable pinion such as 90. By this means, any number of glue pumps associated with carrier 78 may be activated or de-activated, as desired.

Each of the pumps P receives heated liquefied glue from bore 62, through a radial passageway 96 formed in carrier 78. Glue withdrawn from passageway 96 by the pump, is directed into a radial passageway 98 formed in end plate 80, and is then conveyed through a channel 100 to one of a group of radial orifices 102 formed in the peripheral wall of applicator roll 56. Each orifice such as 102 terminates in a recess or cavity 104 formed in the peripheral wall of roll 56, so that glue fed through the orifice to said cavity will accumulate in the cavity to form a globule or bead therein.

It should be noted that the number of orifices and cavities 104 carried by applicator roll 56 is equal to the number of pumps incorporated in carrier 78. Also, each cavity such as 104 is fed through its own passageways 96, 98, 100, by a pump serving only that one cavity. With this arrangement, any glue cavity of applicator roll 56 can be rendered inoperative or inactive by merely declutching the pump which serves it.

The glue cavities 104 of applictaor roll 56 are arranged in a line which is parallel to the roll axis, and are spaced from one another in correspondency with the spacing between the web apertures 46 of FIG. 1. The length of applicator roll 56, and the number of glue cavities carried thereby, should be ample to glue spot the widest of webs 20. When narrower webs are in process, the glue spots can be reduced in number by simply declutching those glue pumps P which are not needed.

The planetary gear 94 for driving the series of pinions 90 and their respective pumps, is to be rotated by means of a variable speed motor or other conventional drive means capable of speed regulation, so that the output of the pumps P can be regulated at will. In the drawings, FIGS. 2 and 3, the variable speed drive means is represented by a chain and sprocket drive 108 which is capable of speed regulation in accordance with accepted engineering practice.

It may here be mentioned that applicator roll 56 is most easily fabricated in two parts, namely, a cylindrical core 110 forming part of shaft 54, and a cylindrical sleeve 112 fixed to and encircling the core. Before application of the sleeve, the core may easily be machined on its peripheral surface to form all necessary glue passageways leading from the twelve (more or less) radial passageways 98 to the twelve (more or less) orifices and cavities 102, 104 which are formed in sleeve 112. Sleeve 112 preferably is formed of aluminum or other metal capable of rapid absorption of heat from the elongate electric heater 68. A catellated lock washer 114 forms part of a conventional means for fixedly securing the sleeve 112 upon core 110.

The applicator roll carries an electric conductor ring 116 which is rotatable with but electrically insulated therefrom, and electric current is brought continuously to the conductor ring by means of a stationary brush contractor 118 connected to a source of supply. An electric resistance wire 120 has electrical connection with ring 116, and with a suitable ground connection, for electrifying the wire and maintaining it in a heated state of incandescence.

The heated wire, or hot wire 120, is fixedly mounted upon the glue applicator roll 56 closely adjacent to all of the glue cavities 104, and trailing said cavities in terms of the direction of rotation of the applicator roll (FIGS. 7–11). In the preferred construction, hot wire 120 occupies space within an elongated open channel 122 formed in the applicator roll periphery, lengthwise and in parallelism with the roll axis. The channel is parallel also to the row of glue cavities 104.

In the vicinity of each glue cavity 104 the hot wire 120 is bared, whereas between said cavities the wire may be covered with insulating sleeves 124 (FIGS. 2 and 4), the sleeves serving to insulate the wire from the metal of roll 56. Although in FIGS. 2 and 4 the hot wire and its sleeve 124 may appear to occupy an external position on the periphery of roll 56, a proper and more practical arrangement is illustrated by FIGS. 7 through 11, wherein the hot wire 120 and its insulating sleeves 124 are shown firmly held and completely confined within channel 122, the bared portion of the wire being exposed at the open side of the channel.

A second hot wire is indicated at 126, this being an elongate electric resistance wire which is stationary, and projected in parallelism with the stripper roll axis. The hot wire 126 may be secured to a stationary arcuate hood 128 which overlies the stripper roll and is spaced from the roll and from a web 20 trained thereon. Wire 126 is continuously charged with electric current through the agency of a terminal 130 (FIG. 2) connected to a suitable source of electric energy.

Hot wire 126 is located close to the glue transfer zone at which glue beads G are deposited upon web 20 by the applicator roll. Said wire is bared of insulation at all locations at which it is traversed by glue cavities 104, and where bared, the wire is maintained continuously incandescent by reason of its electric energization. Wire 126 is stationary, and is spaced from the stripper roll 60 and the web 20 trained thereon a distance slightly greater than the height of a glue bead G deposited upon the web surface.

The hot wires 120 and 126 are maintained at cherry red incandescence, with a temperature approximating 1200° F.

FIGS. 7 through 11 illustrate the function of hot wires 120 and 126. In FIG. 7, a glue bead G formed in an applicator roll cavity 104 by the action of a pump P, is about to be lifted from its cavity by adherence of the bead to web 20. The rolls and the web are in rapid movement as indicated by the arrows.

In FIG. 8, the glue bead G is shown transferred to web 20, except for a residual glue string or tail which has bridged across from orifice 102. The string or tail will be stretched and cut off substantially according to FIG. 9, as web advancement progresses, and a portion thereof will be flung into the heat zone of one or both of the hot wires 120, 126, if not into actual contact with said wires. As the result, the glue string or tail now stretched to a delicate angel hair or thin filament form, will be instantly disintegrated or vaporized by the burning heat of the incandescent wires.

Disintegration of the glue string or filament leaves no perceptible residue, but if any residue does occur, it will be in the form of a minute quantity of light ash or vapor which immediately is dispersed harmlessly due to the rapid motion of the web and rolls 56, 60. The stationary hot wire 126 will clear the top portion of bead G of any glue string carried over by the bead, and will thereby shape and condition the bead for uniformly accurate application to a surface of the web according to FIGS. 1, 12 and 13. The procedure eliminates the production of unsatisfactory glue beads of the kind illustrated by FIG. 14.

The shape, size, and number of hot melt glue beads produced by the apparatus disclosed, can easily and accurately be controlled by regulating the output of pumps P as heretofore explained. Hot melt glue supplied to the apparatus through feed pipe 64 will preferably be delivered thereto under low pressure so as to preclude the occurrence of voids in the feed, and to compensate for any leakage of glue from the system, without producing an objectionable overflow of glue at the applicator roll cavities.

Use of the apparatus herein disclosed results in the rapid uninterrupted production of business forms and the like, without waste and rejects, and with a great reduction in maintenance and downtime expenses. The apparatus is readily applicable to existing collating machines, and will materially enhance their speed and continuity of production.

What is claimed is:

1. The method of controlling glue strings produced incident to transfer of a glue bead from a rotary glue applicator roll to a rapidly advancing web; said method comprising the steps of: advancing the web on a stripper roll at a linear speed equal to the peripheral speed of the applicator roll, with the web contacting said applicator roll and at one location departing from said applicator roll at an angle of tangency; exposing to a face of the advancing web a viscous liquid glue bead carried by the applicator roll, and continuing said web advancement beyond the line of tangency thereby transferring onto said web face the whole of said liquid glue bead with the exception of a thin glue string portion thereof spanning the tangency angle between said web face and the face of said applicator roll; and subjecting the glue string of the bead to high temperature sufficient in value to disintegrate the glue string apart from said bead.

2. The method as defined by claim 1, wherein the final step recited involves subjecting said glue string to a highly heated wire arranged lengthwise of the applicator roll.

3. The method as defined by claim 2, wherein said wire is incandescent.

4. The method as defined by claim 2, wherein said wire is carried by the applicator roll.

5. The method as defined by claim 2, wherein said wire is located within said angle of tangency at a distance from the web approximating the height of the glue bead carried thereon.

6. The method as defined by claim 5, wherein a second highly heated wire is employed, said second wire disintegrating a glue string carried by and extending from said glue bead which is transferred onto the advancing web while said web is being carried by the stripper roll.

7. The method as defined by claim 6, wherein both of said wires are heated to incandescency.

8. The method as defined by claim 1, wherein the heat applied to the glue string is of a high value such as to substantially volatilize the glue string.

9. The method as defined by claim 2, wherein said wire is in the form of an electric resistance heater wire energized by an electric current.

10. The method as defined by claim 7, wherein said wires are in the form of electric resistance heater wires energized by an electric current.

References Cited

UNITED STATES PATENTS

| | | | |
|---|---|---|---|
| 2,911,942 | 11/1959 | Gross | 118—212 X |
| 3,034,476 | 5/1962 | Didde et al. | 118—211 X |
| 3,066,644 | 12/1962 | Sherman et al. | 118—25 X |
| 3,091,411 | 5/1963 | Hearns | 83—171 X |
| 3,134,005 | 5/1964 | Mayhew | 83—171 |
| 3,196,065 | 7/1965 | Liszewski et al. | 118—211 X |
| 3,548,781 | 12/1970 | Hornung | 118—212 X |

WILLIAM D. MARTIN, Primary Examiner

S. P. BECK, Assistant Examiner

U.S. Cl. X.R.

88—171; 171—102 L, 111 R; 118—101, 203, 425—308